(12) United States Patent
Swazey et al.

(10) Patent No.: US 6,432,155 B1
(45) Date of Patent: Aug. 13, 2002

(54) COMPOSITIONS CONTAINING PHOSPHATE AND XANTHAN GUM VARIANTS

(75) Inventors: John M. Swazey; Todd Talashek; Phil Winston, all of San Diego, CA (US)

(73) Assignee: CP Kelco U.S., Inc., Wilmington, DE (US)

( * ) Notice: Subject to any disclaimer, the term of this patent is extended or adjusted under 35 U.S.C. 154(b) by 0 days.

(21) Appl. No.: 09/636,708

(22) Filed: Aug. 11, 2000

(51) Int. Cl.⁷ .......................... C05B 21/00; C05C 13/00
(52) U.S. Cl. ................. 71/27; 71/64.1; 71/32; 536/114
(58) Field of Search ............... 71/27, 64.1, 32; 536/114

(56) References Cited

U.S. PATENT DOCUMENTS

| | | | |
|---|---|---|---|
| 3,281,252 A | 10/1966 | Fairchild | 106/15 |
| 4,154,654 A | 5/1979 | Campagne | 195/31 |
| 4,157,322 A | 6/1979 | Colegrove | 260/15 |
| 4,382,966 A | 5/1983 | Mickus et al. | 426/69 |
| 4,394,447 A | 7/1983 | Cadmus et al. | 435/104 |
| 4,822,524 A | 4/1989 | Strickland | 252/603 |
| 4,855,069 A | 8/1989 | Schuppiser et al. | 252/87 |
| 4,954,443 A | 9/1990 | Yamada et al. | 435/178 |
| 5,028,263 A | 7/1991 | Burdick | 106/194 |
| 5,080,717 A | 1/1992 | Young | 106/197.1 |
| 5,125,952 A | 6/1992 | Moore et al. | 71/28 |
| 5,728,825 A | 3/1998 | Wong | 536/114 |
| 5,861,048 A | 1/1999 | Kamasaka et al. | 71/11 |
| 5,863,861 A * | 1/1999 | Einziger | 504/116 |
| 5,906,962 A | 5/1999 | Pallas et al. | 504/116 |
| 5,958,117 A | 9/1999 | Crouch et al. | 106/18.11 |

FOREIGN PATENT DOCUMENTS

| | | | |
|---|---|---|---|
| CA | 2100017 | 1/1995 | C05G/3/00 |
| DE | 19620893 | 12/1999 | B27N/9/00 |
| FR | 2679552 | 1/1993 | C05G/1/00 |
| JP | 51005570 | 1/1976 | H01L/23/12 |
| JP | 61222980 | 10/1986 | C05F/5/00 |
| JP | 7053292 | 2/1995 | C05G/5/00 |
| JP | 09040485 | 2/1997 | C05G/1/00 |
| JP | 9048687 | 2/1997 | C05G/5/00 |
| WO | 9625055 | 8/1996 | A23K/1/00 |
| WO | WO 97/46606 | 12/1997 | |
| WO | 9945792 | 9/1999 | A23K/1/00 |

OTHER PUBLICATIONS

Colegrove, George T., "Polysaccharide suspending agents for fertilizers containing paraquat", Ind. Eng. Chem. Prod. Res. Dev. (1986), 25(1), 108–11.

* cited by examiner

*Primary Examiner*—Chhaya D. Sayala
(74) *Attorney, Agent, or Firm*—Fitzpatrick, Cella, Harper & Scinto

(57) ABSTRACT

Compositions containing phosphate and xanthan gum variants useful as liquid fertilizers, fire retardant coating materials and animal feed.

6 Claims, No Drawings

COMPOSITIONS CONTAINING PHOSPHATE AND XANTHAN GUM VARIANTS

BACKGROUND OF THE INVENTION

1. Field of the Invention

The invention relates to stable, viscous compositions of phosphate and xanthan gum variants.

2. Discussion of the Related Art

Liquid fertilizers and animal feed compositions are products that contain inorganic and organic materials that are important nutrients for plants and animals, respectively. Often, these compositions are prepared in concentrated form, in which some of the inorganic and organic nutrient materials are insoluble, or only slightly soluble.

Generally, liquid fertilizers, which are also known as fluid fertilizers, contain particular ratios of nitrogen (N), phosphorous (P) and potassium (K) to supplement plant nutrients in the soil. One commonly available liquid fertilizer is referred to as 10-34-0 and is a solution comprising 10% nitrogen, 34% phosphorous and 0% potassium. The ratio of N, P and K in liquid fertilizers may vary widely. The phosphorous contained within most liquid fertilizers is of the polyphosphate type, which is composed of a series of orthophosphate molecules linked through the process of dehydration. Commercially available ammonium polyphosphates are usually a mixture of ortho- and polyphosphates.

In addition to liquid fertilizers, other conventional phosphate-containing compositions include, for example, liquid animal feed compositions, fire retardant coating materials, and the like. For example, liquid animal feed systems typically include 10-34-0, water and other ingredients, such as, for example, urea, molasses, salt, magnesium oxide, and the like. Phosphate-containing fire retardant coating materials, for example, often require enhanced viscosity or the suspension of additional ingredients, such as pigments, metal particles and the like.

Use of the highly concentrated formulations of these compositions is problematic when the poorly soluble nutrient materials or suspended ingredients settle out or precipitate from the composition. These solid materials may clog applicators or may be difficult to re-suspend in the fertilizer, fire retardant coating material or feed mixture. This may result in the target soil, plant or animal receiving less than the desired amount of the nutrient mixture and may result in uneven application of the fire retardant coating material.

Xanthan gum is a useful and versatile viscosifying agent. Xanthan gums are hydrophilic polysaccharides obtained through fermentation of appropriate nutrient media with microorganisms of the genus Xanthomonas. When dissolved in water in low concentration, xanthan gums impart a viscosity to an aqueous solution. The resulting viscosified solutions may be used in a wide variety of industrial applications, such as in the manufacture of food products (sauces, ice creams, etc.) and in oil field drilling fluids. Xanthan viscosified solutions are particularly useful in applications where it is desirable to suspend solid materials in the aqueous medium in a concentrated form. Aqueous solutions containing low concentrations of xanthan gum demonstrate excellent shear properties. Xanthan gum is also readily biodegradable and serves as soluble fiber when ingested by animals. As such, this material is particularly well suited for use as a suspending agent that functions to maintain the homogeneity of suspensions under a variety of temperatures, concentrations and pH conditions.

Unfortunately, conventional xanthan gum is not compatible with compositions containing high concentrations of phosphate materials, particularly ammonium polyphosphate, which are typically found in fertilizers, fire retardant coatings and animal feed compositions. Conventional xanthan gum precipitates, forms complexes, or does not offer sufficient suspension-ability in the presence of the high phosphate concentration generally present in liquid fertilizers, fire retardant coatings or animal feed compositions thereby forming non-homogeneous compositions that are difficult to pour, pump or otherwise administer. These compositions may lose their fluid properties and become difficult, if not impossible, to use.

One inexpensive alternative to xanthan gum that may be used as a viscosifying or suspending agent is clay. However, clay does not offer the same level of suspension-ability as xanthan gum. Moreover, clay-containing compositions may be difficult to administer, for example, in a spray applicator due to the propensity of clay to clog a nozzle.

Other more expensive viscosifying or suspending agents must be used in relatively higher concentrations to provide the viscosity and suspension-ability comparable to that provided by xanthan gum. Accordingly, it would be highly desirable to provide a fluid xanthan gum composition that would be useful for forming fluid compositions, and in particular, fluid compositions containing high concentrations of phosphate.

SUMMARY OF THE INVENTION

The present invention relates to stable, viscous compositions comprising phosphate, xanthan gum variants and water. A preferred embodiment of this invention is directed to a liquid fertilizer composition comprising a xanthan gum variant, phosphate, nitrogen and water. Another embodiment is directed to a liquid animal feed composition comprising a xanthan gum variant, phosphate, water, and at least one of minerals, vitamins, protein, fat, urea, molasses, salt and magnesium oxide. Yet another embodiment relates to a fire retardant composition comprising a xanthan gum variant, phosphate, water, and at least one of a coloring agent, corrosion inhibitor and a metal additive.

DETAILED DESCRIPTION OF THE INVENTION

The stable liquid fertilizer, fire retardant compositions and animal feed compositions of this invention are rheologically modified compositions that possess and retain a homogeneous texture and appearance, even on long term storage. The rheologically modified compositions of this invention possess these features when used in media, or in combination with other elements, having an acid, neutral or basic pH. The xanthan gum variants useful in this invention may be used to increase the viscosity of phosphate-containing solutions and are not limited to the type of phosphate contained within the solution. For example, xanthan gum variants may be used to increase viscosity of solutions containing phosphates, such as orthophosphate, polyphosphate, pyrophosphate, tripolyphosphate, trimetaphosphate, tetrametaphosphate and the like.

Xanthan gum is a heteropolysaccharide of high molecular weight, composed of D-glucose, D-mannose and D-glucuronate moieties in a molar ratio of 2:2:1, respectively. The term "conventional xanthan gum", as used in the present context, includes native xanthan gum, which has been described in numerous publications and patents previously (see, for example, U.S. Pat. Nos. 3,020,206, 3,020,207, 3,391,060 and 4,154,654).

Non-pyruvylated, non-acetylated and non-pyruvylated-non-acetylated xanthan gum variants may be used as effective rheological modifiers in the liquid fertilizer, fire retardant coating materials and animal feed compositions of this invention. When dispersed in fluids, these xanthan gum variants form mixtures exhibiting high viscosity at low shear rates. The term "xanthan gum variants", as used in the present context, includes non-pyruvylated, non-acetylated and non-pyruvylated-non-acetylated xanthan gums whether produced through fermentation of mutant strains of Xanthomonas or produced through chemical or enzymatic processes performed on conventional xanthan gum or any combination thereof. The term "phosphate", as used in the present context, includes, but is not limited to orthophosphate, polyphosphate, pyrophosphate, tripolyphosphate, trimetapliosphate and tetrametaphosphate in any combination. The term "non-pyruvylated xanthan gum", as used in the present context, includes a xanthan gum having a pyruvate content of about 0 to about 1.5%, preferably of about 0 to about 1.0%, and more preferably, of about 0 to about 0.5%. The term "non-acetylated xanthan gum", as used in the present context, includes a xanthan gum having an acetate content of about 0 to about 1.5%, preferably of about 0 to about 1.0%, and more preferably of about 0 to about 0.5%. The term "non-pyruvylated-non-acetylated xanthan gum", as used in the present context, includes a xanthan gum having a pyruvate content of about 0 to about 1.5% and an acetate content of about 0 to about 1.5%, preferably a pyruvate content of about 0 to about 1.0% and an acetate content of about 0 to about 1.0%, and more preferably, a pyruvate content of about 0 to about 0.5% and an acetate content of about 0 to about 0.5%.

Xanthan gums, which may also be described as hydrophilic colloids, may be used in the practice of this invention. It is preferred to use the aqueous solutions of the hydrophilic colloid produced by the bacterium Xanthomonas campestris, which compound and its preparation are fully described in U.S. Pat. No. 3,659,026.

Other Xanthomonas colloidal materials (xanthan gums) that may be useful for the preparation of stable liquid fertilizers, fire retardant compositions and animal feed compositions may be obtained from other known *Xanthomonas bacteria*, i.e., *Xanthomonas carotate, Xanthomonas incanae, Xanthomonas begoniae, Xanthomonas malverum, Xanthomonas vesicatoria, Xanthomonas papavericola, Xanthomonas translucens, Xanthomonas vasculorum* and *Zanthomonas hederae*.

Conventional xanthan gum is typically acetylated and pyruvylated to various degrees. Acetate substituents are found on xanthan gum in two different locations. One is located through an ester linkage at the C(6) position of the mannose residue adjacent to the main chain (Jansson, P.E., et al., *Carbohydr. Res.*, 45:275–282 (1975)). Another acetate substituent may be found on the terminal mannose residue of the side chain in situations where this mannose residue is not pyruvylated (Hasser, R. A. and Doherty, D. H., *Biotechnol. Prog.*, 6:182–187 (1990)). The second acetyl substituent is typically found at very low levels in conventional xanthan gum. The acetate content (% based on solids) may be determined by hydrolyzing the xanthan gum under acidic conditions, subjecting the hydrolyzate to high-performance ion-exclusion chromatography and analyzing by a chemically suppressed conductivity detection method or equivalent thereof. Pertinent analytical articles disclosing methods useful for determining acetate include: Cheetham, N. W. H. and Punruckvong, A., *Carbohydr. Polym.*, 5:399–406 (1985); Tait, M. I., et al., *Carbohydr. Polym.*, 13:133–148 (1990); Stankowski, J. D., et al., *Carbohydr. Res.*, 241:321–326 (1993); all of which are incorporated herein by reference in their entirety.

The xanthan gum variants for use in this invention may be prepared by fermentation of mutant strains of *Xanthomonas campestris* as described in U.S. Pat. No. 5,514,791, the disclosure of which is incorporated herein by reference. Additionally, non-acetylated xanthan gum for use in this invention may be prepared by chemical deacetylation of xanthan gum produced by *Xanthomonas campestris* as described in U.S. Pat. Nos. 3,000,790 and 3,054,689. Alternative methods of generating deacylated xanthan gum are well-known to those of skill in the art. Non-acetylated xanthan gum also may be purchased commercially; for example, Kelzan® ASX is available from Kelco Biopolymers, San Diego, Calif.

Xanthan gum may be chemically depyruvylated; one technique is described by Holzwarth and Ogletree in *Carbohydr. Res.*, 76:277–280 (1979). Strains of Xanthomonas have been described that produce non-pyruvylated xanthan gum, for example, U.S. Pat. No. 4,296,203. Additionally, xanthan gum may be chemically deacylated and depyruvylated. Although the xanthan gum variants for use in the present invention may be generated according to chemical processes, the conditions under which chemical deacetylation and depyruvylation are conducted are harsh, frequently causing xanthan polymer degradation. Consequently, the xanthan gum variants for use in the present invention preferably are prepared by fermentation of mutant strains of *Xanthomonas campestris*.

Xanthan gum functionality includes providing such properties as thickening, heat stabilization, freeze-thaw stabilization, suspension-ability, flow control, foam stabilization, coating and film formation, textural quality modification, and the like. The xanthan gum variant may be used in any form, for example, as isolated from the fermentation broth, or as a dry product, produced by drying the xanthan gum variant after precipitation from the xanthan broth using well-known drying techniques, such as spray-drying or freeze-drying.

The xanthan-stabilized compositions of this invention contain a xanthan gum variant and inorganic and/or organic nutrient materials or suspended ingredients in an aqueous suspension. Generally, these stable compositions may be prepared by adding the phosphate-containing ingredients either prior to, simultaneously with, or subsequent to, dissolution of the xanthan gum variant in water. The amount of xanthan gum variant present in the stable compositions of this invention will vary depending on the xanthan gum variant used and on the desired viscosity of the composition, i.e., as required for a specific use. For example, xanthan gum variants typically will be present in an amount from about 0.05% to about 5% by weight, and preferably, in an amount that is about 0.1% to about 1% by weight of the total weight of the composition. Preferably, the xanthan gum variant used in this invention will be non-acetylated, or non-pyruvylated, or non-pyruvylated-non-acetylated xanthan gum.

The concentration of phosphate present in the stable compositions of this invention may vary depending on the xanthan gum variant used, the intended use for the composition and the type of salt present, i.e., different salts, such as ammonium, diammonium or potassium, have different saturation levels. For example, the concentration of phosphate may range from about 0% to about 24% and preferably, from about 10% to about 24%. It is within the purview of one of ordinary skill in the art to modify the viscosity of the composition according to its desired use. For example, viscosity may vary depending upon whether the end use of the composition is to suspend solids, to provide "cling" or to modify pouring characteristics, i.e., to mitigate splashing.

Xanthan gum variants may be used to increase viscosity of liquid fertilizers containing conventional ingredients, such as nitrogen, phosphate, potassium and other elements. Examples of such commercially available liquid fertilizers include, but are not limited to those referred to as 10-34-0 and 11-37-0, as well as those liquid fertilizers in which the nitrogen concentration ranges from about 0% to about 32% the phosphate concentration ranges from about 0% to about 37%; and the potassium concentration rages from about 0% to about 16%. Xanthan gum variants are particularly useful as viscosity enhancing agents for use in liquid fertilizers containing high concentrations of phosphate because they may provide stability not previously achievable.

In another embodiment, xanthan gum variants may be used to increase the viscosity, facilitate the suspension of insoluble ingredients and/or to modify the textural qualities of animal feed compositions. For example, a liquid animal feed composition may contain a xanthan gum variant in an amount ranging from about 0.05% to about 0.25%. Typically, liquid animal feed compositions include 10-34-0, water and other ingredients, such as, for example, minerals, vitamins, protein, fat, urea, molasses, salt, magnesium oxide, and the like. The amounts of these components used in liquid animal feed compositions may vary and are well known to those skilled in the art. Generally, the liquid animal feed is supplied to animals via a wheel. Animals are attracted to the molasses within the feed, and upon licking the wheel, receive the nutrients contained within the feed composition.

In yet another embodiment, xanthan gum variants may be used to increase viscosity and/or to modify the textural properties of fire retardant compositions. Modification of the textural properties of fire retardant compositions may be important, for example, to increase adhesiveness of the fire retardant composition to vegetation if aerially applied to aid in extinguishing wildfires. Similarly, it may be desirable to modify the textural properties of the fire retardant composition when used as a fore retardant coating material, such as a paint, mastics and the like. Frequently, fire retardant compositions require the suspension and/or dispersion of additional ingredients, such as coloring agents, corrosion inhibitors or metal additives, i.e., zinc and copper. The amounts of such additional ingredients employed in fire retardant compositions may vary and are well known to those skilled in the art. For example, a fire retardant composition may contain a xanthan gum variant in an amount ranging from about 0.05% to about 2.0%, and preferably, from about 0.1% to about 1.0%. Examples of coloring agents that typically may be used in fire retardant compositions include, but are not limited to iron oxide, titanium dioxide and a fugitive pigment that gradually fades over time. Typically, corrosion inhibitors may be added to increase the length of time fire retardant compositions may be stored in metal containers. Examples of suitable corrosion inhibitors include, but are not limited to mercaptobenzothiazole, sodium ferrocyanide and the like. The increased viscosity of fire retardant compositions containing xanthan gum variants may increase the stability of the coating material during storage. One example of a phosphate-containing fire retardant is Phos-Chek® manufactured by Solutia, Inc. of St. Louis, Mo. Phos-Chek®, which contains ammonium polyphosphate, is useful in applications requiring both aqueous and non-aqueous formulations, including intumescent coatings, particularly, fire retardant paints and mastics.

The examples that follow are intended as an illustration of certain preferred embodiments of the invention, and no limitation of the invention is implied.

EXAMPLE 1

Formation of a Viscous Liquid Fertilizer Composition

This example demonstrates formation of a liquid fertilizer composition through addition of ammonium polyphosphate prior to dissolution of the xanthan gum variant.

A 210 g aliquot of 10-34-0 ammonium polyphosphate (obtained from Liquid Ag Systems, Inc., under the trade-name "Micro Green", or its equivalent) was transferred to a Hamilton Beach Malt Mixer® mixing cup. A 90 g aliquot of tap water was transferred to the mixing cup and mixing commenced at about 4,000 rpm. During the mixing, about 0.75 g (0.25%) non-pyruvylated-non-acetylated xanthan gum was added to the vortex. The mixing speed was increased to about 12,000 rpm and mixed for about 45 minutes.

The resulting fluid composition was viscous and provided good suspension properties. This level of 10-34-0 solution created a thixotropic fluid that gelled slightly, but was easily disrupted into a liquid. At room temperature, stability appeared good without observable syneresis. The solution remained fluid for 10-34-0 levels of 65% and lower. Syneresis refers to separation of a liquid from a gel after contraction. Thixotropic refers to the ability of a composition to become fluid upon shaking or disruption and subsequently to thicken upon standing.

Typically, conventional xanthan gum will not develop viscosity under these conditions. Additionally, non-acetylated xanthan gum will hydrate in levels up to about 65% 10-34-0.

EXAMPLE 2

Formation of a Viscous Liquid Fertilizer Composition

This example demonstrates formation of a liquid fertilizer composition through addition of ammonium polyphosphate subsequent to dissolution of the xanthan gum variant.

A sample of about 0.75 g (0.25% final weight) non-pyruvylated-non-acetylated xanthan gum was hydrated in 90 g tap water and mixed to assure full hydration of the xanthan gum polymer. The xanthan gum solution was transferred to a Lightnin'® mixer equipped with a low pitch propeller blade and mixed at about 500 rpm. While mixing, about 210 g of 10-34-0 ammonium polyphosphate was added to the solution.

The resulting liquid fertilizer composition had characteristics similar to those described in the previous example. Typically, conventional xanthan gum will precipitate after about 90 g of 10-34-0 ammonium polyphosphate is added to the mixture.

EXAMPLE 3

Solubility of Xanthan Compositions Containing Polyphosphate

This example demonstrates the solubility of compositions of conventional xanthan gum and xanthan gum variants made with 10-34-0 ammonium polyphosphate. Conventional xanthan gum (Kelzan®, Keltrol BT®), non-acetylated xanthan gum (Kelzan ASX®), non-pyruvylated xanthan gum (NPX) and non-pyruvylated-non-acetylated xanthan gum (NPNAX) at 0.25% were mixed into a solution of 10-34-0 and standard tap water for about 30 min. to about 45 min. in a Hamilton Beach Malt Mixer®.

The viscosity depicted in the following tables was measured with a Brookfield DV-III viscometer equipped with a small sample adapter and a SC4-18 spindle. Standard tap water is a solution composed of 20 g sodium chloride and 2.94 g calcium chloride dihydrate in 20 liters distilled water.

TABLE 1

Solubility Of Conventional Xanthan Gum Compositions In
Ammonium Polyphosphate Solutions

| | Level of 10-34-0 sol 'n- | KELZAN | KELZAN | KELTROL BT |
|---|---|---|---|---|
| RPM | Shear Rate 1/sec | 40% cP | 45% cP | 45% cP |
| 0.3 | 0.4 | 1140 | — | — |
| 0.6 | 0.79 | 775 | — | — |
| 1.5 | 1.98 | 458 | — | — |
| 3 | 3.96 | 292 | — | 67 |
| 6 | 7.92 | 182 | — | 49 |
| 12 | 15.8 | 115 | — | 37 |
| 20 | 26.4 | 82 | 8 | 29 |
| 30 | 39.6 | 62 | 7 | 25 |
| 60 | 79.2 | 40 | 6 | 18 |

****Refers to readings that were off scale.
—Refers to readings that were below scale.

TABLE 2

Solubility of Non-Acetylated Xanthan Gum Compositions
In Ammonium Polyphosphate Solutions

| | Level of 10-34-0 sol 'n- | KELZAN ASX | | | | |
|---|---|---|---|---|---|---|
| RPM | Shear Rate 1/sec | 45% cP | 50% cP | 52% cP | 60% cP | 65% cP |
| 0.3 | 0.4 | 2640 | 2700 | 3000 | 1820 | 1100 |
| 0.6 | 0.79 | 1675 | 1720 | 1834 | 1140 | 670 |
| 1.5 | 1.98 | 890 | 928 | 962 | 648 | 384 |
| 3 | 3.96 | 540 | 554 | 576 | 421 | 217 |
| 6 | 7.92 | 315 | 323 | 338 | 289 | 128 |
| 12 | 15.8 | 186 | 192 | 202 | 169 | 85 |
| 20 | 26.4 | 127 | 132 | 139 | 99 | 64 |
| 30 | 39.6 | 94 | 98 | >100 | 72 | 51 |
| 60 | 79.2 | >50 | >50 | **** | 48 | 35 |

****Refers to readings that were off scale.

The non-acetylated xanthan gum (ASX) solutions with 60% and 65% ammonium polyphosphate demonstrated instability over time. A soft, non-continuous gel formed with syneresis.

TABLE 3

Solubility Of Non-Acetylated-Non-Pyruvylated And Non-
Pyruvylated Xanthan Gum Compositions In Ammonium
Polyphosphate Solutions

| | Level of 10-34-0 sol 'n- | NPNAX | | | NPX | NPX |
|---|---|---|---|---|---|---|
| RPM | Shear Rate 1/sec | 55% cP | 62% cP | 70% cP | 55% cP | 60% cP |
| 0.3 | 0.4 | 5550 | 5030 | 4400 | 690 | — |
| 0.6 | 0.79 | 3134 | 2950 | 2590 | 495 | — |
| 1.5 | 1.98 | 1422 | 1462 | 1192 | 270 | — |
| 3 | 3.96 | 778 | 823 | 679 | 162 | — |
| 6 | 7.92 | 434 | 463 | 393 | 100 | — |
| 12 | 15.8 | >250 | >250 | 236 | 67 | — |
| 20 | 26.4 | **** | **** | >150 | 50 | — |
| 30 | 39.6 | **** | **** | **** | 38 | 4 |
| 60 | 79.2 | **** | **** | **** | 26 | 4 |

****Refers to readings that were off scale.
—Refers to readings that were below scale.

The non-pyruvylated-non-acetylated xanthan gum (NPNAX) solution at 70% ammonium polyphosphate demonstrated soft gelation with time but no syneresis after 3 weeks at room temperature.

EXAMPLE 4

Solubility of Xanthan Compositions Containing Orthophosphate

This example demonstrates the solubility of compositions of xanthan gum and xanthan gum variants made with diammonium phosphate. Conventional xanthan gum (Kelzan®), non-acetylated xanthan gum (Kelzan ASX®), non-pyruvylated xanthan gum (NPX) and non-pyruvylated-non-acetylated xanthan gum (NPNAX) at 0.25% were mixed into a solution of diammonium phosphate and distilled water for about 30 min. to about 45 min. in a Hamilton Beach Malt Mixer®.

The viscosity depicted in the following tables was measured with a Brookfield DV-III viscometer equipped with a small sample adapter and a SC4-18 spindle.

TABLE 4

Solubility Of Conventional Xanthan Gum Compositions And
Non-Acetylated Xanthan Gum Compositions In Diammonium
Phosphate Solutions

| Level of DAP solution --> | | KELZAN | | | KELZAN ASX | | |
|---|---|---|---|---|---|---|---|
| RPM | Shear Rate 1/sec | 20% cP | 25% cP | 30% cP | 20% cP | 30% cP | 35% cP |
| 0.3 | 0.4 | 1180 | ---- | ---- | 2900 | 3300 | 1090 |
| 0.6 | 0.79 | 825 | ---- | ---- | 1760 | 1970 | 715 |
| 1.5 | 1.98 | 498 | ---- | ---- | 894 | 990 | 418 |
| 3 | 3.96 | 326 | ---- | ---- | 522 | 574 | 272 |
| 6 | 7.92 | 205 | ---- | ---- | 299 | 333 | 175 |
| 12 | 15.8 | 129 | ---- | ---- | 175 | 199 | 118 |
| 20 | 26.4 | 93 | ---- | ---- | 120 | 138 | 90 |
| 30 | 39.6 | 69 | 5 | ---- | 89 | >100 | 72 |
| 60 | 79.2 | 44 | 4 | 5 | >50 | **** | 50 |

**** Refers to readings that were off scale.
---- Refers to readings were below scale.

The non-acetylated (Kelzan ASX) solution at 35% demonstrated inconsistent gelation, which may be indicative of instability over time.

TABLE 5

Solubility of Non-Pyruvylated-Non-Acetylated Xanthan
Gum Compositions And Non-Pyruvylated Xanthan Gum
Compositions In Diammonium Phosphate Solutions

| Level of DAP solution --> | | NPNAX | | | NPX | |
|---|---|---|---|---|---|---|
| RPM | Shear Rate 1/sec | 30% cP | 35% cP | 40% cP | 25% cP | 30% cP |
| 0.3 | 0.4 | 3600 | 5460 | 5459 | — | — |
| 0.6 | 0.79 | 2230 | 3320 | 3234 | — | — |
| 1.5 | 1.98 | 1160 | 1660 | 1600 | — | — |
| 3 | 3.96 | 690 | 949 | 914 | — | — |
| 6 | 7.92 | 401 | **** | **** | — | — |
| 12 | 15.8 | 234 | **** | **** | — | — |
| 20 | 26.4 | >150 | **** | **** | — | — |
| 30 | 39.6 | **** | **** | **** | 5 | — |
| 60 | 79.2 | **** | **** | **** | 4 | 5 |

****Refers to readings that were off scale.
—Refers to readings were below scale.

The non-pyruvylated-non-acetylated (NPNAX) solution at 40% demonstrated soft gelation over time.

While the present invention is described above with respect to what is currently considered to be its preferred embodiments, it is to be understood that the invention is not limited to that described above. To the contrary, the invention is intended to cover various modifications and equivalent arrangements included within the spirit and scope of the appended claims.

We claim:

1. A composition comprising:
   (i) a xanthan gum variant,
   (ii) phosphate, and
   (iii) water.

2. The composition of claim 1, wherein the xanthan gum variant is selected from the group consisting of non-acetylated xanthan gum, non-pyruvylated xanthan gum and non-acetylated-non-pyruvylated xanthan gum.

3. A liquid fertilizer composition comprising:
   (i) a xanthan gum variant,
   (ii) phosphate,
   (iii) nitrogen, and
   (iv) water.

4. The liquid fertilizer composition of claim 3 further comprising potassium.

5. The liquid fertilizer composition of claim 3, wherein the xanthan gum variant is selected from the group consisting of non-acetylated xanthan gum, non-pyruvylated xanthan gum and non-acetylated-non-pyruvylated xanthan gum.

6. A method of fertilizing soil comprising the step of administering the composition of claim 3 to soil in need of nutrient supplementation.

* * * * *

UNITED STATES PATENT AND TRADEMARK OFFICE
CERTIFICATE OF CORRECTION

PATENT NO.    : 6,432,155 B1
DATED         : August 13, 2002
INVENTOR(S)   : John M. Swazey et al.

It is certified that error appears in the above-identified patent and that said Letters Patent is hereby corrected as shown below:

Column 3,
Line 9, "trimetapliosphate" should read -- trimetaphosphate --;
Line 28, "Xanthomonas campestris," should read -- *Xanthomonas campestris*, --; and
Line 38, "Zan-" should read -- Xan- --.

Column 4,
Line 66, "32%" should read -- 32%; --.

Column 5,
Line 12, "U.S. application Ser. No. 09/239,696, filed Jan. 29, 1999," should read -- U.S. Application No. 09/239,696, filed January 29, 1999, --.
Line 28, "fore" should read -- fire --.

Column 7,
Line 62, "application Ser. No. 09/239,696, filed Jan. 29, 1999, entitled" should read -- Application No. 09/239,696, filed January 29, 1999, entitled --.

Column 8,
Lines 40 and 64, "were" should read -- that were --.

Column 9,
Line 37, after "service and" delete "the,".

Column 10,
Line 35, after "claim 19" insert -- , --.

Signed and Sealed this

Twenty-ninth Day of April, 2003

JAMES E. ROGAN
*Director of the United States Patent and Trademark Office*